USOO6453410B1

(12) United States Patent
Satoh (10) Patent No.: US 6,453,410 B1
(45) Date of Patent: Sep. 17, 2002

(54) COMPUTER SYSTEM HAVING A CACHE MEMORY AND A TRACING FUNCTION (75) Inventor: Shuji Satoh, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/348,042

(22) Filed: Jul. 6, 1999

(30) Foreign Application Priority Data

Jul. 3, 1998 (JP) ............................................ 10-188915

(51) Int. Cl.[7] .............................................. G06F 11/00
(52) U.S. Cl. ............................ 712/227; 714/30; 714/38
(58) Field of Search ........................... 712/227; 714/25, 714/27, 30, 724, 742, 47, 37, 38

(56) References Cited

U.S. PATENT DOCUMENTS

| 4,674,089 A | * | 6/1987 | Poret et al. ..................... 714/28 |
| 5,379,301 A | * | 1/1995 | Sato et al. ....................... 717/4 |
| 5,564,028 A | * | 10/1996 | Swoboda et al. ............. 712/227 |
| 5,751,735 A | * | 5/1998 | Tobin et al. .................. 714/733 |
| 5,933,626 A | * | 8/1999 | Mahalingaiah et al. ...... 712/227 |
| 6,055,651 A | * | 4/2000 | Sasaki et al. .................. 714/45 |

FOREIGN PATENT DOCUMENTS

| JP | 63-083841 | 4/1988 |
| JP | 02-051745 | 2/1990 |
| JP | 03-137736 | 6/1991 |
| JP | 03-256141 | 11/1991 |
| JP | 03-263136 | 11/1991 |
| JP | 4-296944 | 10/1992 |
| JP | 06-083705 | 3/1994 |
| JP | 06-161818 | 6/1994 |
| JP | 07-271705 | 10/1995 |
| JP | 08-0959045 | 4/1996 |
| JP | 8-171505 | 7/1996 |
| JP | 08-171505 | 7/1996 |
| JP | 08-335177 | 12/1996 |
| JP | 10-011290 | 1/1998 |
| JP | 10-240570 | 9/1998 |

OTHER PUBLICATIONS

Japanese Office Action, dated Apr. 2, 2001, with English language translation of Japanese Examiner's comments. Partial Trans.
Japanese Office Action, dated Jul. 6, 2000, with English language translation of Japanese Examiner's comments. Partial Trans.
Japanese Office Action, dated Dec. 7, 2000, with English language translation of Japanese Examiner's comments. Partial.

* cited by examiner

Primary Examiner—William M. Treat
(74) Attorney, Agent, or Firm—Whitham, Curtis & Christofferson, PC (57) ABSTRACT A computer system operates for pipe-line processing, and includes a cache memory and a tracing circuit for tracing the operation of the pipe-line processor for developing the computer system. The pipe-line processing is executed in separate stage blocks, and the trace data are supplied to the tracing circuit through a dedicated tracing bus at the final stage of the pipe-line processing. If the data is hit in the cache memory, the trace data can be provided to the tracing circuit without losing real time processing.

9 Claims, 6 Drawing Sheets

COMPUTER SYSTEM HAVING A CACHE MEMORY AND A TRACING FUNCTION

BACKGROUND OF THE INVENTION (a) Field of the Invention

The present invention relates to a computer system and, more particularly, to a computer system having a cache memory and a data tracing function.

(b) Description of the Related Art

A computer system generally includes a microprocessor (MPU), a ROM for storing a program for operating the MPU, a RAM for storing read/write data, and a peripheral device. During developing a computer system, a tracing circuit is generally provided to the MPU for examining whether or not the MPU operates expected functions, i.e., for debugging.

Conventionally, the tracing circuit is connected to an external system bus such as an address bus or a data bus to obtain historical data of the MPU 21 at desired timing for storage thereof in the tracing memory. However, if the MPU has a cache memory in the computer system, the tracing circuit connected to the external system bus cannot obtain the data accessed by the MPU when the accessed data is hit in the cache memory.

SUMMARY OF THE INVENTION

It is an object of the present invention to provide a computer system having a cache memory for storing instruction code and read/write data, and a tracing circuit capable of tracing read/write data, address thereof and status signals in each instruction without losing real time processing.

The present invention provides a computer system including a pipe-line processor for pipe-line processing of an instruction code in synchrony with a pipe-line clock signal, a system memory for storing data for the pipe-line processor, a system bus for transferring data between the pipe-line processor and the memory, a tracing circuit for storing trace data output from the pipe-line processor, and a trace data transfer circuit for transferring the trace data between the pipe-line processor and the tracing circuit independently of operation of the system bus.

In accordance with the computer system of the present invention, trace data can be supplied to the tracing circuit independently of the system bus without affecting the operation of the system bus and without losing real time processing by the pipe-line processor.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 1:
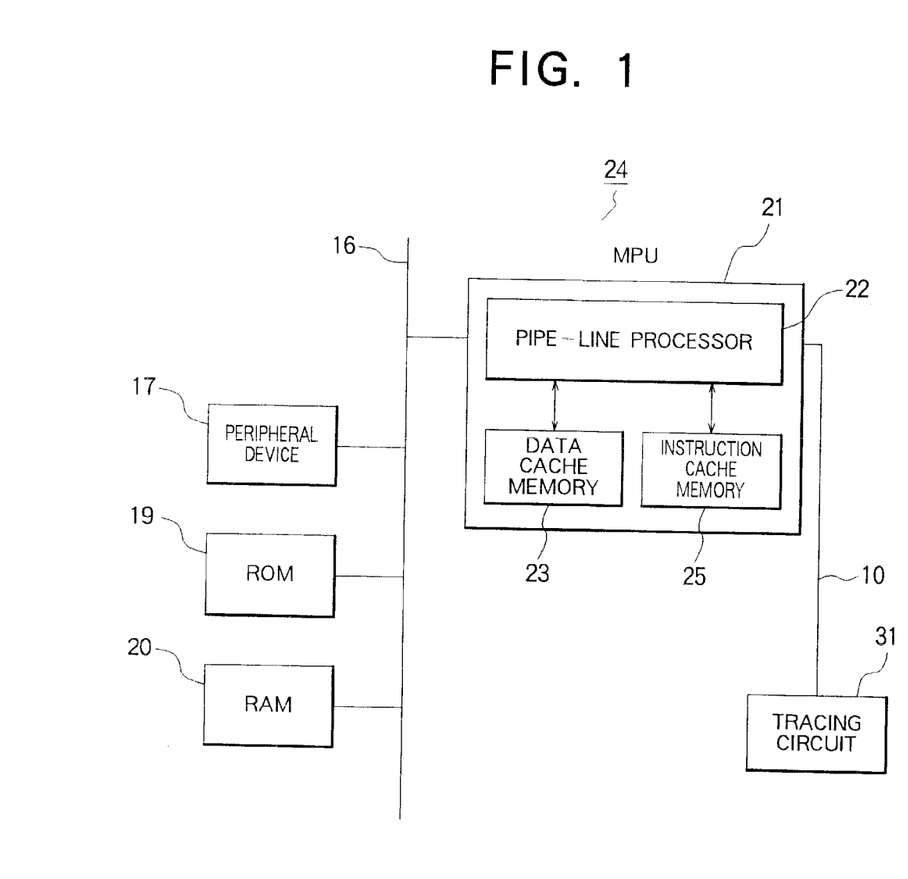
FIG. 1 is a block diagram of a computer system according to an embodiment of the present invention.

Referring to FIG. 1, a computer system according to an embodiment of the present includes a MPU 21 for executing signal processing based on a program, a peripheral device 17 such as a disk drive, a ROM 19 for storing the program, a RAM 20 for storing read/write data, a system bus 16 for transferring data between the MPU 21 and the external circuits including the peripheral device 17, the ROM 19 and the RAM 20, a tracing circuit 31 for tracing the signal processing executed by the MPU 21 together with read/write data, a tracing bus 10 for transferring the data and signals between the MPU 21 and the tracing circuit.

The tracing circuit obtains the data from the MPU 21 for tracing the read/write data, address thereof and status signals. The MPU 21 includes a pipe-line processor 22, a data cache memory 23 for temporarily storing read/write data and an instruction cache memory 25 for storing instruction codes executed by the MPU 21. Each of the cache memories 23 and 25 includes a memory array and a cache controller not shown in the drawing. The pipe-line processor 22 functions for executing the instructions provided thereto at five separate stages.

Figure 2:
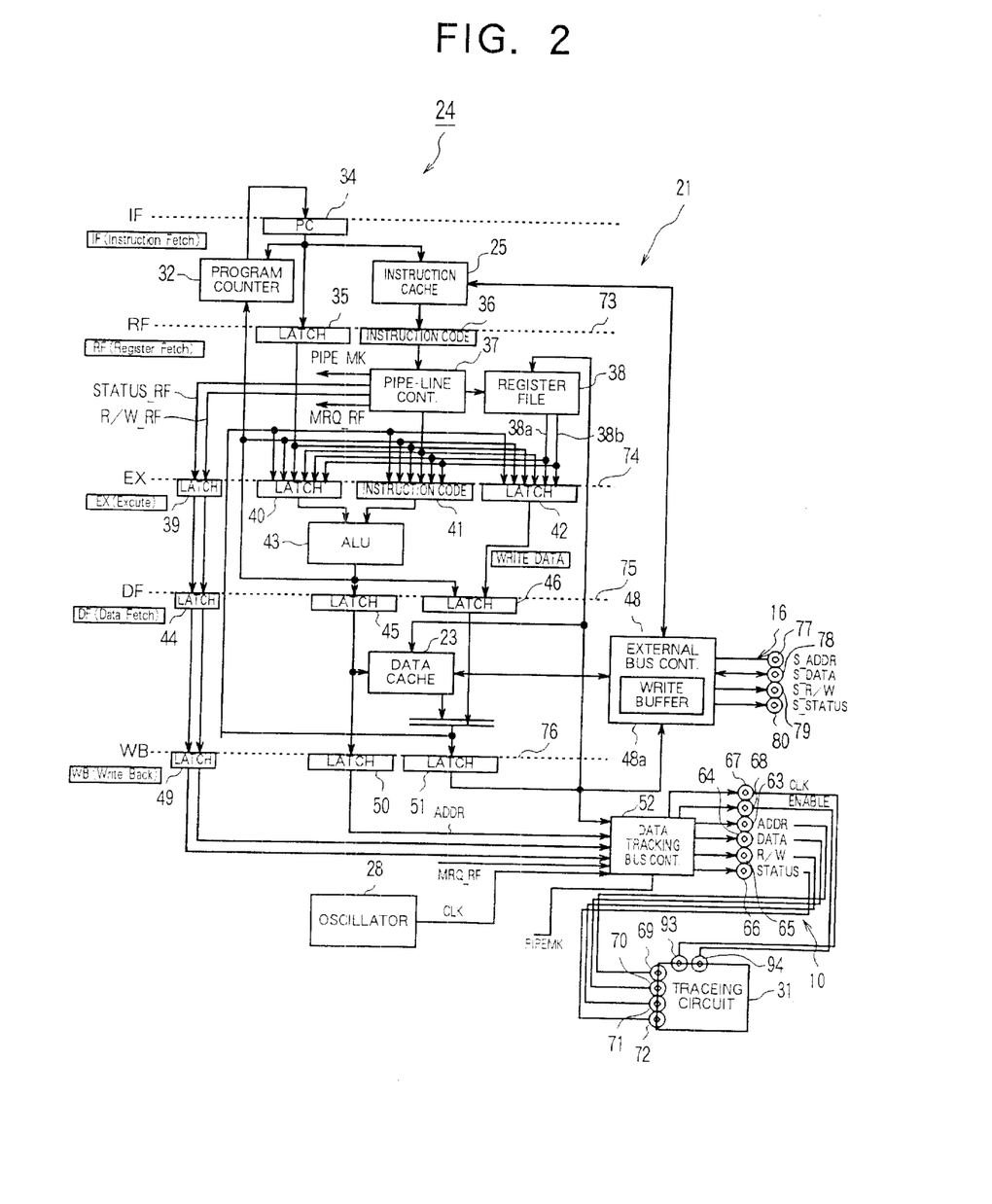
FIG. 2 is a detailed block diagram of the computer system of FIG. 1.

Referring to FIG. 2, the MPU 21 includes stage blocks for executing five separate pipe-line stages including an instruction fetch stage (IF stage), a register fetch stage (RF stage), an execution stage (EX stage), a data fetch stage (DF stage) and a write back stage (WB stage). The MPU 21 also includes a pipe-line controller 37 for controlling the operation of the stage blocks, an external bus controller 48 for controlling the data transfer on the system bus 16 between the stage controllers 37 and the external circuits, and a data tracing bus controller 52 for controlling the data transfer on the tracing bus 10 between the MPU 21 and the tracing circuit 31.

The IF stage block includes a program count generator 32, an instruction cache memory 25 and a program counter (PC) 34. The program counter 34 holds an instruction fetch address of the current instruction, and generates a next instruction fetch address for the next instruction by adding the current instruction fetch address and a specified value. An instruction code is fetched based on the address of the instruction cache memory 25 or the ROM 19 specified by the program counter 34, and stored in a RF stage register 73. After a branch instruction etc. is executed, the program count generator 32 generates an instruction fetch address for the branch instruction and stores the address thereof in the program counter 34.

The RF stage block includes a pipe-line controller 37, a register file 38, and the RF stage register 73. The RF stage register 73, which is located adjacent the IF stage block, includes a PC latch 35 for latching an output from the program counter 34 and an instruction code latch 36 for latching an instruction code output from the instruction cache memory 25. These latches 35 and 36 in the RF stage register 73 operate for latching in synchrony with a pipe-line clock signal PIPECLK. The pipe-line controller 37 operates for all the pipeline stages, although it is shown in the RF stage block for convenience.

The pipe-line controller 87 functions for reading an instruction code from the instruction code latch 36 for decoding the same to control overall operations in the pipe-line processing of the computer system. The pipe-line controller 37 outputs status signals STATUS_RF corresponding to the current instruction code, read/write signal R/W_RF and a memory request signal MRQ_RF. The symbol "xxx_RF" of the signal as used herein means that the signal is generated in a RF stage, and shifts to a symbol "xxx_EX" when the current stage shifts to an EX stage. That is, xxx_RF assumes a value same as the value of xxx_EX etc. and has a different effective timing therefrom.

The register file 38 includes a plurality of registers numbered in sequence, and one of the registers is accessed for read/write thereof when the corresponding number is input as an access key. For example, the register file 38 includes a decoder for a read/write address and each register includes a plurality of cascaded flip-flops. The data stored in the register of the register file 38 remains as it is when the data is read out simply by supplying the register number. When a data is to be stored in the register of the register file 38, the corresponding register number, write data and a clock signal for controlling the write operation are supplied.

The EX stage block includes an arithmetic logic unit (ALU) 43 and an EX stage register 74. The EX stage register 74 includes three latches 40, 41 and 42 for latching ordinary process data output from the pipe-line controller 37 and the register file 38, and EX stage tracing latches 39 for latching status signals STATUS_RF and a read/write signal R/W_RF. The latches 40, 41 and 42 latch data output from the register file 38, the result of the calculation by the ALU 43 and the address of the read/write data, in synchrony with the pipe-line clock signal PIPECLK.

The ALU 43 receives the instruction fetch address from the PC latch 35 through the latch 40 and outputs 38a and 38b from the register file 38 through the latch 41, then executes the arithmetic operation and supplies the result to the DF stage block.

The DF stage block includes a data cache memory 23 and a DF stage register 75. The DF stage register 75 includes a DF stage tracing latch 44 for latching an output from the EX stage tracing latch 39, a latch 45 for latching an output from the ALU 43 and a latch 46 for latching the write data output from the latch 42.

The data cache memory 23 transfers data between the same and the pipe-line processor 22 including the pipe-line controller 37, and stores read/write data. If requested data is not hit in the data cache memory 23, the data cache memory 23 delivers the address signal, the read/write signal and the status signal for the miss-hit data to the external bus controller 48, and requests the same to effect a read bus cycle therefor.

The WB stage block includes a WB stage register 76 which includes a WB stage tracing latch 49 for latching an output from the DF stage tracing latch 44, a latch for latching an access address output from the latch 45, and a latch 51 for latching one of the read data output from the data cache memory 23 and the write data output from the latch 46 by using a selector.

The MPU 21 includes, in addition to the stage blocks as described above, the external bus controller 48 and the data tracing bus controller 52. The MPU 21 further includes address terminals 77 for an address S_ADDR, data terminals 78 for data S_DATA, a read/write signal terminal 79 for S_R/W, and status signal terminals 80 for status signals S_STATUS.

The external bus controller 48 is connected to those terminals 77 to 80 as well as to the system bus 16 for transferring data through the system bus 16. The external bus controller 48 transfers data through the system bus 16 between the same and the external circuit such as ROM 19, RAM 20 or peripheral device 17, transfers a pre-fetch signal etc. between the instruction cache memory 25 and the ROM 19, transfers read data between the data cache memory 23 and the RAM 20, and receives write data from the WB stage block for storing the same to the RAM 20 by using a built-in write buffer 48a. That is, the external bus controller 48 outputs an address S_ADDR, a read/write signal S_R/W and status signals S_STATUS, while inputting/outputting a data S_DATA. Thus, the write operation to the memory, or RAM 20, is effected by the write buffer 48a without affecting and independently of the pipeline processing of the computer system.

The MPU 21 further includes, as trace data output terminals, address output terminals 63 for an address ADDR, data output terminals 64 for a data DATA, a read/write signal output terminal 66 for a read/write signal R/W, status signal output terminals 66 for status signals STATUS, a clock signal output terminal 67 for a clock signal CLK, and an enable signal output terminal 68 for an enable signal ENABLE. These output terminals 63 to 68 are connected to respective output terminals 63a to 68a and connected to the tracing circuit 31 via the data tracing bus 10.

The address output terminals 63 deliver the address ADDR of the data accessed by a load/store instruction, the data output terminals 64 deliver the read/write data DATA, and the read/write signal output terminal 65 delivers a read/write signal for indicating whether the trace data is a read data or a write data. The status signal output terminals 66 deliver, in addition to the status information of the bus cycle, data size information as to whether the read/write data is a 1-byte (8-bit) data, 1-half-word (16-bit) data, 1-word (32-bit) data or a double-word (64-bit) data, effective data location information as to which bit is an effective data out of the 32-bit data when the data is a half-word data or a 1-word data and sequential information as to the order of the data.

The data tracing bus controller 52 receives read/write data DATA accessed by the load/store instruction from the latch 51, an address ADDR from the latch 50, a read/write signal R/W and status signals STATUS from the latches 49, and delivers these data to the data tracing bus 10.

The tracing circuit 31 is connected to the data tracing bus 10, and receives trace data therefrom through input terminals 69 to 72, 93 and 94.

Figure 3:
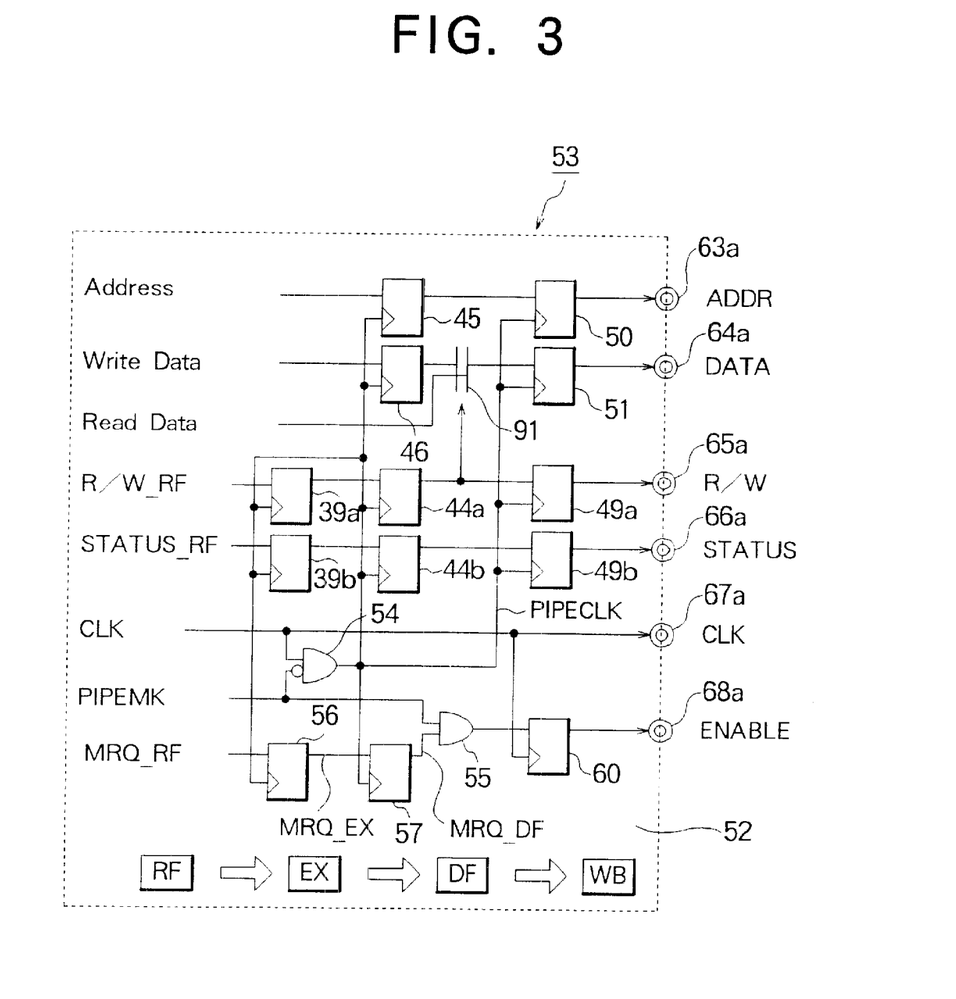
FIG. 3 is a block diagram of the data tracing bus controller shown in FIG. 2.

Referring to FIG. 3, there is shown the detail of a specific circuit portion of FIG. 2, generally designated by numeral 53, including the data tracing controller 52 and associated latches in the stage blocks. The latches 45, 46 and 51 in FIG. 3 are used for the tracing as well as for the pipe-line processing.

The circuit portion 53, which implements a trace data transfer circuit together with the data tracing bus 10, includes cascaded tracing latches 39, 44 and 49 for transferring status signals STATUS_RF and a read/write signal R/W_RF from the pipe-line controller 37 through respective series of latches 39a, 44a and 49a and 39b, 44b and 49b to the final stage block, cascaded latches 45 and 50 for transferring the calculated address ADD from the ALU 43 to the final stage, cascaded latches 46 and 51 for transferring read/write data DATA to the final stage, and the data tracing bus controller 52.

The data tracing bus controller 52 has an output terminal 67a for outputting a clock signal CLK, an output terminal 68a for outputting an enable signal ENABLE, output terminals 63a for outputting an address ADDR, output terminals 64a for outputting read/write data DATA, an output terminal 65a for outputting a read/write signal R/W, output terminals 66a for outputting status signals STATUS, an output terminal 67a for outputting a clock signal CLK, and an output terminal 68a for outputting an enable signal ENABLE. The data tracing bus controller 52 passes trace data DATA and the clock signal CLK supplied from the final stage latches 49a,, 49b, 50 and 51 to the output terminals 65a, 66a, 63a, '64a and 67a , respectively. The data tracing bus controller 52 includes an enable signal generator for generating an enable signal ENABLE and outputs the same through the output terminal 68a.

The MPU 21 includes a pipe-line clock generator which generates a pipe-line clock signal PIPECLK and includes a two-input AND gate 54. The AND gate 54 receives the system clock signal CLK and inverted signal of the pipe-line mask signal PIPEMK and delivers an output to the latches 39a, 39b, 56, 44a, 44b, 57, 45, 46, 49a, 49b, 60, 50 and 51 at their clock inputs. The AND gate 54 passes the clock signal CLK as a pipe-line clock signal PIPECLK while the pipe-line mask signal assumes a low level, and stops the clock signal CLK to hold the PIPECLK signal at a low level while the pipe-line mask signal PIPEMK assumes a high level. The pipe-line clock signal controls signal processing in the pipe-line processing.

The enable signal generator in the data tracing bus controller 52 includes a 2-input AND gate 55, and latches 56, 57 and 60. The latches 56 and 57 receive the pipe-line clock signal PIPECLK at their clock inputs, whereas the latch 56 receives a memory request signal MRQ__RF from the pipe-line controller 37 to deliver an output MRQ__EX to the latch 57, which delivers a memory request signal MRQ__RF. The AND gate 55 receives an inverted signal of the pipe-line mask signal PIPEMK and an output from the latch 57 to deliver an output to the data input of the latch 60. The memory-request signal MRQ__RF is generated by the pipe-line controller 37 after the pipe-line controller 37 detects a load/store instruction. The memory request signal MRQ__RF assumes a high level or a low level depending on whether or not the external circuit such as RAM 20 or the peripheral device 17 is accessed for data transfer.

The latch 60 receives the clock signal CLK at the clock input thereof, and delivers an enable signal ENABLE through the enable signal output terminal 68a. The enable signal ENABLE assumes a high level during a first clock period of the clock signal CLK after an instruction code accompanied by a load/store instruction is received in the WB stage block, thereby rendering only the first clock pulse of the clock signal CLK to be effective. Thus, it is avoided to repeatedly store the same trace data in the tracing memory 58 when the pipe-line processing is stopped.

The memory request signal MRQ__RF delivered from the pipe-line controller 37 is latched by the EX stage tracing latch 56 at the next rise of the pipe-line clock signal PIPECLK, whereby the latch 56 delivers a MRQ__EX signal. MRQ__EX signal assumes a high level when a load/store instruction accompanied by a data access for read/write is execute d. For example, when Inst2(R) is decoded at the RF stage and detected to be an instruction accompanied by a read operation, the pipe-line controller 37 delivers a high level for MRQ__RF to the latch 56 at time t2. When the pipe-line clock signal PIPECLK rises at time t3, the latch latches the high level for MRQ__RF to raise an output MRQ__EX from the latch 56, as shown at 25 row (j) of FIG. 5.

Figure 4:
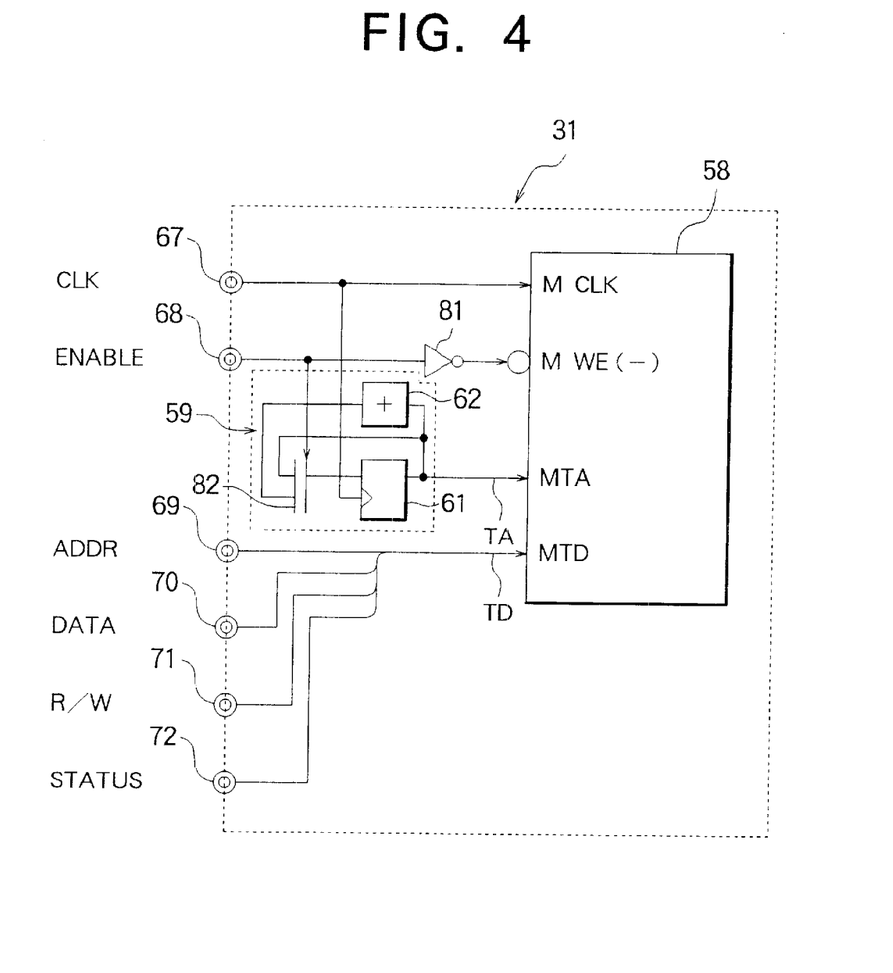
FIG. 4 is a block diagram of the tracing circuit shown in FIG. 2.

The increment circuit (address adder) 59 includes a plurality of flip-flops 61, an adder 62 and a selector 82, and delivers an address (signal) TA to the address inputs MTA of the tracing memory 58 based on the clock signal CLK and the enable signal ENABLE received therein. The number of flip-flops 61 corresponds to the number of the address inputs of the tracing memory 58. The adder 62 increments (or decrements) the current address signal TA by one to calculate the address of the next trace data. The selector 82 selects an output from the flip-flop 61 when the enable signal ENABLE assumes a low level, and selects an output from the adder 62 when the enable signal ENABLE assumes a high level. When the clock signal CLK rises to a next high level, the selected output from the selector 82 is stored in the flip-flops 61. Thus, when the pipe-line processing is stopped to lower the enable signal ENABLE to a low level, the increment circuit 59 delivers the same address. Accordingly, even after a plurality of clock pulses are supplied to the clock input MCLK of the tracing memory 58, the trace data is stored in the same address, thereby raising the efficiency of the tracing memory 58.

The enable signal ENABLE input through the enable signal input terminal 68 is subjected to inversion by the inverter 81 to be input to the input MWE(-) of the tracing memory 58, thereby allowing the storage of the write data at a high level of the enable signal ENABLE. Thus, only the trace data in the bus cycle specified by the load/store instruction among all the bus cycles is stored in the tracing memory 58.

The data signals TD input to the tracing circuit 31 include address ADD, data DATA, read/write signal R/W and status signal STATUS, which are supplied to the inputs MTD of the tracing memory 58 and received therein at the timing of a low level of the write enable signal WE(-). The data width or number of the inputs TD of the tracing memory 58 corresponds to the sum of the data widths of these data.

Figure 5:
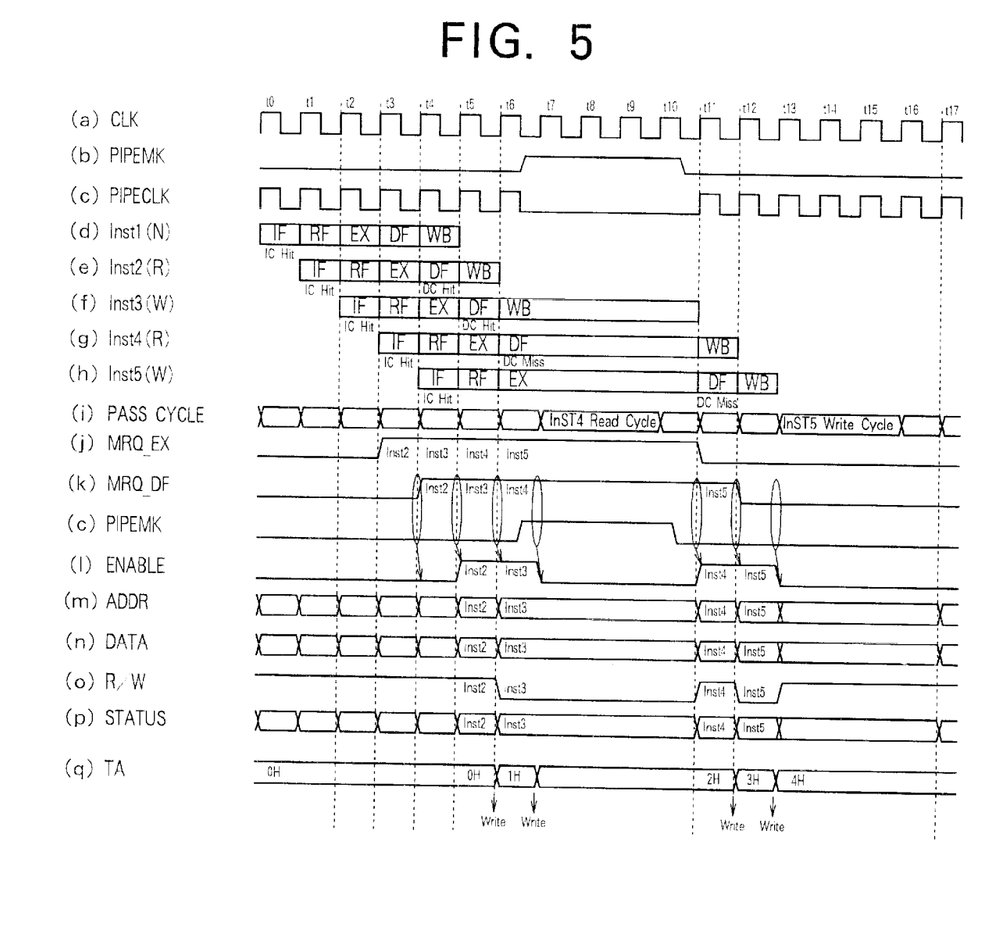
FIG. 5 is a timing chart of the computer system of FIG. 1.

Referring to FIG. 5, there is shown a specific example wherein five instructions Inst1 to Inst5 are delivered from the MPU, wherein (N) attached to Inst1 indicates that Inst1 is a normal instruction which stays within the MPU 21 and does not involve a read/write operation for the external circuit, (R) attached to Inst2 and Inst4 indicates that Inst2 and inst4 are read instructions, and (W) attached to Inst3 and Inst5 indicates that Inst3 and Inst5 are write instructions. "IC Hit" attached to each instruction indicates that the instruction cache memory 25 is hit in the instruction and "DC Hit" attached to specific instructions indicates that the data cache memory 23 is hit in the specific instruction, whereas "DC Miss" indicates that the data cache memory 23 is miss hit.

The memory request signal MRQ#RF delivered from the pipe-line controller 37 is latched by the EX stage tracing latch 56 at the next rise of the pipe-line clock signal PIPECLK, whereby the latch 56 delivers a MRQ#EX signal. MRQ#EX signal assumes a high level when a load/store instruction accompanied by a data access for read/write is executed. For example, when Inst2(R) is decoded at the RF stage and detected to be an instruction accompanied by a read operation, the pipe-line controller 37 delivers a high level for MRQ#RF to the latch 56 at time t2. When the pipe-line clock signal PIPECLK rises at time t3, the latch latches the high level for MRQ#RF to raise an output MRQ#EX from the latch 56, as shown at row (j) of FIG. 5.

MRQ__EX signal in the fifth instruction Inst5(W) is latched-at time t6 by the latch 56 until the EX stage for Inst5 is finished at time t10. If a succeeding instruction Inst6 not shown is a normal instruction, the output of the pipe-line controller 37 assumes a low level at time t6, which is latched by the latch 56 at time t11 at a rising edge of the pipeline clock signal, thereby lowering the output of the latch 56 to a low level.

The latch 57 latches the output of the latch 56 at a rising edge of the pipe-line clock signal. That is, MRQ__DF signal is obtained by latching an output MRQ__EX from the latch 56 at a rising edge of the pipe-line clock signal PIPECLK, and thus is shifted from MRQ__EX by one clock of the pipe-line clock signal. For example, the latch 60 latches an output from the AND gate 55 at a rising edge of the clock signal CLK and delivers an output as an enable signal ENABLE, as shown at row (k) of FIG. 5.

The AND gate 65 receives MRQ__DF signal and an inversion of pipe-line mask signal PIPEMK to deliver a MRQ__DF signal only when the pipe-line mask signal PIPEMK assumes a low level. The latch 60 latches an output frQm the AND gate 55 at a rising edge of the clock signal CLK to deliver an enable signal ENABLE.

The enable signal ENABLE assumes a high level at a first clock pulse of the clock signal CLK after an instruction accompanied by a load/store instruction reaches to the WB stage block. For example, MRQ__DF signal in Inst2(R) assumes a high level at time t4, which makes the output of the AND gate 55 at a high level due to a low level of the pipeline mask signal at this stage. When the clock signal CLK rises at time M the enable signal ENABLE output from the AND gate 55 assumes a high level as shown at row (1) of FIG. 5.

The MRQ__DF signal of Inst4(R) assumes a high level at time t6, which makes the output of the AND gate 55 at a high level due to a low level of the pipe-line mask signal PIPEMK at this stage. The pipe-line mask signal PIPEMK signal rises at the last half of time t6, to lower the output of the AND gate 55. The latch 60, after latching the output of the AND gate 55 at a rising edge of the clock signal CLK, delivers a low level for the enable signal ENABLE at time t7, as shown at row (1) of FIG. 5.

Figure 6:
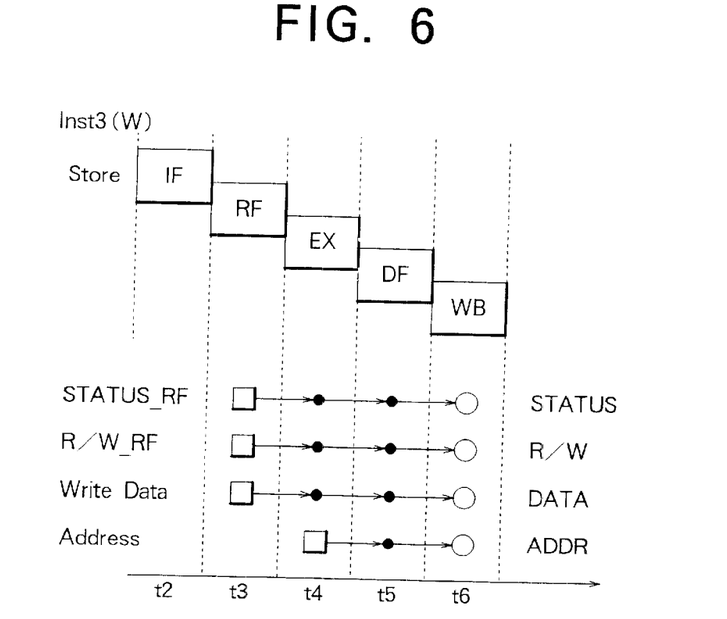
FIG. 6 is a timing chart for executing the third instruction shown in FIG. 2.
Figure 7:
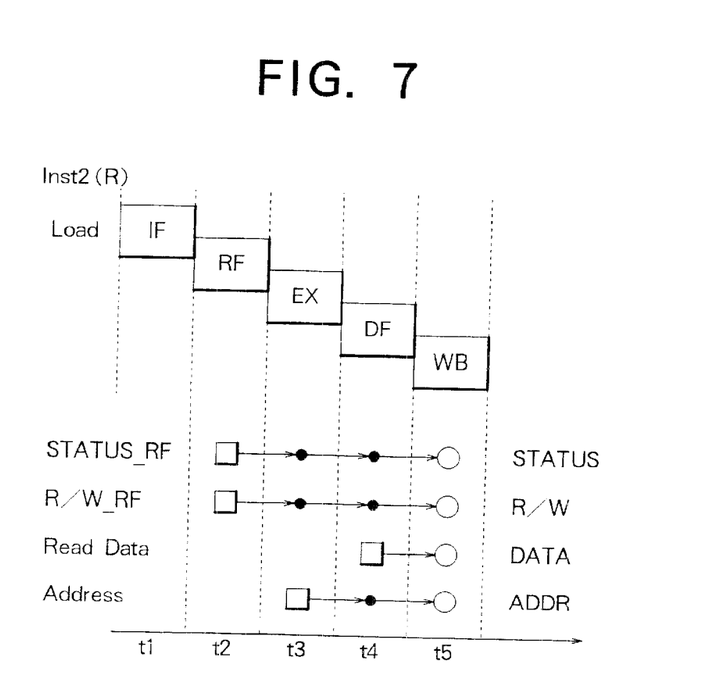
FIG. 7 is a timing chart for executing the second instruction shown in FIG. 2.

Referring to FIGS. 6 and 7, there is shown processing for instructions Inst3(W) and Inst2(R), respectively, wherein a square shows a timing of generation of the corresponding signal, a circle shows a timing of transferring of the signal to the tracing bus, and a dot shows a shift of the signal to a next stage.

In FIG. 6, the instruction code for Inst3(W) is fetched at t2 during the IF stage and decoded at t3 during the RF stage. At this stage, the pipe-line controller 37 reads the write data from the register in the register file 38 specified by the instruction and stores the same in the latch 42, and at the same time t3, delivers a read/write signal R/W__RF and status signals STATUS__RF thereof to the latches 39a and 39b.

The write data, read/write signal and the status signal are latched at time t4 by the latches 42, 39a and 39b, respectively, at a rising edge of the pipe-line clock signal PIPECLK, and delivered as Write Data__EX, R/W__EX and STATUS__EX, respectively, to the next EX stage.

The ALU 43 then calculates the address for the write data and delivers the address to the latch 45 at time t4 during the EX stage.

When the pipe-line clock signal PIPECLK rises at time t5 during the DF stage, the address, the write data, the read/write signal and the status signal are latched by the latches 45, 46, 44a and 44b, respectively, which then deliver signals Address__DF, Data__DF, R/W__DF and STATUS__DF (refer to (m)–(p) of FIG. 5).

If the data cache memory 23 is hit, as in the case of Inst3 in FIG. 5, the address ADDR and the data DATA are stored in the data cache memory 23. On the other hand, if the data cache memory 23 is miss hit, as in the case of Inst5 in FIG. 5, the write data is stored in the write buffer 48a provided in the external bus controller 48, and also stored in the RAM 20 by the external bus controller 48 when the system bus 16 is not used for other task. In addition, these signals ADDR, DATA, R/W and STATUS are supplied to the tracing circuit through the tracing bus 10, and stored in the address 1H of the tracing memory 58 (refer to (g) of FIG. 5).

In FIG. 7, the instruction Inst2(R) is fetched at time t1 during the IF stage, and decoded at time t2 during the RF stage. The pipe-line controller 37 delivers a read/write signal $RW_{-R}$ RF indicating a read instruction and status signals $STATUS_{-R}$ F thereof at time t2.

The signals $R/W_{-R}$ RF and $STATUS_{-R}$ RF are latched by the latches 42, 39a and 39b at a rising edge of the pipe-line clock signal at time t3 during the EX stage, and delivered as signals $R/W_{-R}$ EX and $STATUS_{-R}$ EX. The ALU 43 calculates the address for the write data at time t3 during the EX stage and 5 delivers the same to the latch 45.

When the pipe-line clock signal rises at time t4 during the DF stage, the address, read/write signal and the status signal are latched by the latches 45, 44a and 44b, respectively, which deliver signals Address__DF, R/W__DF and STATUS__DF. The address is also supplied to the data cache memory 23. If the data is hit in the data cache memory 23, the data cache memory 23 reads data therein based on the supplied address and delivers the read data to the latch 51 through the selector 91. The selector 91 selects the write data when the read/write signal indicates a write mode and selects the read data when the read/write signal indicates a read mode.

If the data cache memory 23 is hit, as in the case of Inst2 of FIG. 5, the address ADDR and the data DATA are read from the data cache memory 23. On the other hand, if the data cache memory 23 is miss hit, as in the case of Inst4 of FIG. 5, a read bus cycle is requested of the external bus controller 48, the pipe-line clock signal is maintained at a high level to stop the pipe-line processing, and the data is read from the RAM 20.

At time t5 during the WB stage, when the pipe-line clock signal rises. the address, the read data,, the read/write signal and the status signal are latched by the latches 50, 51, 49a and 49b, which deliver Address_WB, Read Data_WB, R/M_WB and STATUS_WB, respectively. These signals area also supplied to the tracing circuit 31 through the tracing bus 10, and stored in the address 0H in the tracing memory 58 (refer to (g) of FIG. 5).

As described above, the trace data in a single instruction are generated in the different stages depending on the signals. In addition, the effective timing of the data depends on the storage instruction or the load instruction. In the above embodiment, these different timing is adjusted by the number of stages of cascaded latches provided from the stage block at which the signal is generated to the stage block at which the signal is transferred to the tracing circuit, the latches operating in synchrony with the pipe-line clock signal. Thus, the tracing circuit can receive the signals at a uniform timing for any instructions.

The timing does not change even if the instruction concerns storage or load of data or if the read data is hit or miss hit in the cache memory. Thus, the inversion of the order of the trace data, wherein the succeeding data is traced before the preceding data, as encountered in the conventional device does not arise, whereby the data tracing can be effected in the order without using a monitor circuit for the bus cycle.

Back to FIGS. 2 and 5, the sequential operation of the computer system will be further described in more detail.

The computer system generally operates by transferring data between the MPU 21 and the external circuit such as the peripheral device 17, RAM 20 and the ROM 19, as mentioned before. The pipe-line processing is executed in a single stage cycle with the case of hit or miss hit in the cache memories, wherein the computers system executes a single instruction in a single pipe-line cycle.

In the present embodiment, the pipe-line processing for the instruction such as Inst1 to Inst5 is executed in a single instruction cycle including five separate stages by passing one stage by one stage. If the cache memory is miss hit, the pipe-line controller 37 delivers a low level for the pipe-line clock signal to stop the operation of all the stages for the instruction.

If the pipe-line processing is allowed to advance, the pipe-line mask signal PIPEMK is inactivated to activate the pipe-line clock signal PIPECLK, whereby the instruction advances in synchrony with the pipe-line clock signal.

When a pipe-line processing is started, and if the instruction cache memory 25 is hit during the IF stage, as indicated by "ICHit" in FIG. 5, the program count generator 32 updates the count in the program counter 34, which delivers a PC address to the instruction cache memory 25. The PC address is also stored in the PC latch 35 in the RF stage register 73. Thus, the instruction code is read from the instruction cache memory 25 based on the PC address and stored in the instruction code latch 36 in the RP stage register 73.

If the instruction code is miss hit, the fetch address and a request for the fetch bus cycle are delivered from the instruction cache memory 25 to the external bus controller 48. The external bus controller 48, upon miss hit of instruction code, receives the fetch address from the instruction cache memory 25 to access the ROM 19. The external bus controller 48, upon miss hit of data, receives the access address, which is obtained by calculation and stored in the latch 45 during the EX stage, through the data cache memory 23 to access the RAM 20 through the system bus 16.

During the RF stage, the data stored in the register in the register file 38, specified by the register number, is read as outputs 38a and 38b based on the signals from the pipe-line controller 37. The register number and the PC address from the program counter 34 are latched by latches 40, 41 and 42 in the EX stage register 74

During the EX stage, the ALU 43 calculates based on the data read from the latches 40 and 41 in the EX stage register 74. At this stage, if the instruction code indicates a load/store instruction, the result of the calculation indicates the address of the data. The output of the ALU 43 is supplied to the latches 45 and 46 and stored therein.

During the DF stage, the MPU 21 accesses the data cache memory 23 based on the address obtained during the EX stage, if the instruction indicates a load/store instruction. If the data cache memory 23 is hit, as shown by "DC Hit" in FIG. 5 for Inst2(R) etc., the data is read from the data cache memory 23 when the instruction code indicates a load instruction, and is stored in the data cache memory 23 during the WB stage. The data is also stored in the latch 51 in the WB stage register 76. If the data is miss hit, the MPU 21 accesses the peripheral device or the RAM 20 through the external bus controller 48 and the system bus 16.

During the WB stage of a load instruction, the read data read from the latch 51 in the WB stage register 76 is stored again to the register file 38. The data latched by the latch 51, the read/write signal and the status signal read from the latch 50 are supplied to the data tracing bus controller 52.

In the case of a load/store instruction, the memory request signal MRQ__DF becomes active and thus the memory request signal MRQ__DF is generated after a single clock cycle, as a result of which the write enable signal assumes a high level to output the trace data in the final WB stage after all the trace data are prepared in the WB stage block.

If the trace data are to be stored, the data tracing bus controller 52 stores the trace data including the address, data, read/write signal and the status signal in synchrony with the pipe-line clock signal, and supplies these data to the data tracing bus 10 through the tracing terminals 63 to 66.

Now, processing for each instruction code will be described, with reference to FIGS. 2 to 5. The first instruction Inst1(N) is executed in the first through fifth stages thereof, which does not involve trace data because the instruction is a normal instruction without a load/store operation.

Assuming that the second instruction Inst2(R) is a read instruction which indicates read-out of data from the address of B01 in the RAM 20, the pipe-line controller 37 supplies the PC address in the program counter 34 to the instruction cache memory 25, fetches instruction Inst2 from the cache memory 25, and allows the latch 36 to latch the fetched instruction.

During the RF stage at time t2, the pipe-line controller 37 decodes Isnt2 by reference to the data in the instruction code latch 36, and allows the latches 40 and 41 to latch the address of the RAM 20 to be accessed. The pipe-line controller 37 also delivers a MRQ__RF signal, a R/W$_R$ F signal, a STATUS$_R$ F signal, to store these signals in the tracing latches 39 in synchrony with the pipe-line clock signal.

During the EX stage at time t3, the ALU 43 calculates based on the data stored in the latches 40 and 41, and stores the result of the calculation, i.e., address B01, in the latch 45. The outputs from the tracing latches 39 including MRQ__EX, R/W$_R$ EX and STATUS_EX signals are latched by the tracing latches 44 in synchrony with the pipe-line clock signal. As a result, the MRQ_EX signal rises to a high level as shown in (j) of FIG. 5.

During the DF stage at time t4, the address B01 and the read signal stored in the latch 45 are supplied to the data cache memory 23. If the access address B01 is hit in the data cache memory 23, the data cache memory 23 delivers data D01 to the latch 51 through the selector 91. The access address B01 and the read data D01 are then latched by the latches 50 and 51, respectively, in synchrony with a next pulse of the pipe-line clock signal.

The read/write signal R/W and the status signal STATUS output from the tracing latch 44 are latched by the latch 49 in synchrony with the pipe line clock signal. On the other hand, the MRQ__EX signal is latched by the tracing latch 44, the output of which is a MRQ__DF signal and assumes a high level (refer to (k) of FIG. 5). The MRQ__DF signal is supplied together with an inverted signal of the pipe-line clock signal to the AND gate 55, which delivers an enable signal ENABLE__DF. The ENABLE__DF signal is latched by the tracing latch 60 in synchrony with the clock signal CLK.

During the WB stage at time t5, the pipe-line controller 37 writes the data stored in the latch 51 to one of the registers in the register file 38. At this stage, the latches 50 and 51 deliver the address and the data to the address output terminals 63a and the data output terminals 64a, respectively (refer to (m) and (n) of FIG. 6).

The read/write signal R/W_DF and the status signal STATUS_DF output from the tracing latch 49 are delivered to the output terminals 65a and 66a, respectively (refer to (o) and (p) of FIG. 5. The enable signal ENABLE output from the tracing latch 49 is delivered to the output terminal 68a in synchrony with the clock signal CLK. Thus, the enable signal assumes a high level at time t5 (refer to (1) of FIG. 5.

For the instruction Inst2, hit in the data cache memory 23, data in the instruction can be also traced by the tracing circuit 31. Specifically, the tracing terminals 63a to 68a dedicated for the tracing can receive the trace data through the dedicated tracing bus 10. The tracing circuit 31 stores these trace data in the tracing memory 58 at the address OH. After the trace data are stored in the tracing memory 58, the address is incremented by one to assume 1H and prepared to a next write operation.

Assuming that instruction Inst3 indicates a write instruction of data D02 at the address of B02 in the RAM 20, the operations from time t2 to time t5 are similar to the conventional process. In addition, the processing for the status signal, the read/write signal and the memory request signal are similar to those in the instruction Inst2.

During the WB stage at time t6, the address B02 and the data DO stored in the latches 50 and 51 are delivered to the data cache memory 23 and stored therein. At this stage the trace data is supplied to the tracing circuit 31 through the tracing bus 10, and stored in the tracing memory 58 at the address of 1H (refer to (g) of FIG. 5). After the trace data are stored in the tracing memory 58, the address is incremented by one in synchrony with the clock signal CLK to assume 2H to prepare a next write operation.

Assuming that the instruction Inst4 indicates a read operation of data D03 from the address B03 in the RAM 20, operations from time t3 to time t5 are similar to those in the instruction Inst2. During the DF stage at time t6, the address B03 and the read/write signal R/W are supplied to the data cache memory 23. The data cache memory 23, if the address B03 is miss hit, delivers the access information including the address B03 and the read/write signal to the external bus controller 48, thereby requesting the external bus controller 48 to read the data through the system bus 16.

The data cache memory 23 also requests the pipe-line controller 37 to stop the pipe-line processing. The pipe-line controller 37 responds to the request and maintains the pipe-line mask signal PIPEMK at a high level between time t6 and time t10, which in turn maintains the pipe-line clock signal at a low level. Thus, all the stage blocks stop their pipe-line processing of the instruction (refer to (c) of FIG. 5). After the stop of pipe-line processing, the shift of the status signal, read/write signal and the memory request signal is also stopped, whereby the latches maintains their states.

During time interval between t7 and t9, the external bus controller 48 executes a read bus cycle for the instruction Inst4, and reads the data D03. During time t10, the data cache memory 23 allows the latch 51 to latch the data D03 through the selector 91 and requests the pipe-line controller 37 to cancel the stop of pipe-line processing. The pipe-line controller 37 then lowers the pipe-line mask signal to a low level (refer to (c) of FIG. 5), activates the pipe-line clock signal to allow the stage blocks to operate for the pipe-line processing.

During the WB stage at time t11, the data stored in the latch 51 is supplied to and stored in a specified register in the register file 38. At the same time, the trace data including the address B03 and the read data D03 are also supplied to the tracing circuit 31 through the tracing bus 10. The tracing circuit 31 receives these trace data and stores the same in the tracing memory 58 at an address 2H (refer to (q) of FIG. 5). After the storage of the trace data, the address of the tracing memory is incremented by one to prepare a next write operation.

Assuming that the instruction Inst5(W) indicates a write operation of data D04 to the RAM 20 at an address B04, the operations from time t4 to time t11 are similar to those for the instruction Inst3. During the WB stage at time t12, the pipe-line controller 37 writes the data (address B04 and data D04) stored in the latches 50 and 51 to the data cache memory 23, as well as to the write buffer 48a in the external bus controller 48. Thus, the pipe-line processing of the MPU for the instruction Inst5 is finished.

For the tracing of the data, during the WB stage at time t5, the trace data for the instruction Inst5 are supplied to the tracing circuit 31 through the tracing bus 10, which stores these data in the tracing memory 58 at the address 3H. The address of the tracing memory 58 is then incremented by one to prepare a next write operation.

As described above, in the computer system of the present embodiment, a dedicated tracing bus is provided for the tracing circuit. Also, all the trace data are prepared for tracing at the final stage of the pipe-line processing cycle. Thus, the tracing can be conducted without losing real time processing and maintaining the data cache function of the computer system. Further, the tracing operation does not affect the operation of the pipe-line processing by the computer system.

What is claimed is:

1. A computer system comprising:
   a pipe-line processor for pipe-line processing of an instruction code in synchrony with a pipe-line clock signal,
   a system memory for storing data for said pipe-line processor,
   a system bus for transferring data between said pipe-line processor and said memory,
   a tracing circuit for storing trace data output from said pipe-line processor, and
   a trace data transfer circuit for transferring said trace data between said pipe-line processor and said tracing circuit independently of operation of said system bus,
   wherein said trace data transfer circuit transfers said trace data to said tracing circuit at a final stage of said pipe-line processing, and
   wherein said trace data transfer circuit comprises a mask signal generator for generating a mask signal for masking said pipe-line clock signal for a specified interval depending on said instruction code.

2. The computer system as defined in claim 1, wherein said tracing circuit repeatedly stores said trace data in a tracing memory at the same address when said mask signal masks said pipe-line clock signal.

3. The computer system as defined in claim 1, wherein said pipe-line processing includes an instruction fetch stage, a register fetch stage, an execution stage, a data fetch stage, and a write back stage.

4. The computer system as defined in claim 1, further comprising a data cache memory cache memory.

5. The computer system as defined in claim 1, wherein said trace data transfer circuit includes a dedicated tracing bus for transferring said trace data to said tracing circuit.

6. The computer system as defined in claim 5, wherein said trace data transfer circuit includes at least one group of cascaded latches for transferring one of said trace data in synchrony with said pipe-line clock signal, said cascaded latches include a first stage latch for latching data generated in a first stage of said pipe-line processing and a last stage latch for transferring data to said tracing bus.

7. The computer system as defined in claim 6, wherein said at least one group includes a plurality of groups of cascaded latches, said final stage latches of said plurality of groups of cascaded latches outputting said trace data at the same clock pulse of said pipe-line clock signal.

8. The computer system as defined in claim 1, further comprising an instruction cache memory.

9. The computer system as defined in claim 1, further comprising a data cache memory and an instruction cache memory.

* * * * *